United States Patent
Tamaki et al.

(10) Patent No.: US 10,990,491 B2
(45) Date of Patent: Apr. 27, 2021

(54) STORAGE CONTROL APPARATUS AND RECOVERY METHOD OF A FAILED TRACK

(71) Applicant: HITACHI, LTD., Tokyo (JP)

(72) Inventors: Ryo Tamaki, Tokyo (JP); Shintaro Ito, Tokyo (JP); Toshiaki Terao, Tokyo (JP)

(73) Assignee: HITACHI, LTD., Tokyo (JP)

( * ) Notice: Subject to any disclaimer, the term of this patent is extended or adjusted under 35 U.S.C. 154(b) by 146 days.

(21) Appl. No.: 16/295,858

(22) Filed: Mar. 7, 2019

(65) Prior Publication Data
US 2020/0097377 A1    Mar. 26, 2020

(30) Foreign Application Priority Data

Sep. 20, 2018 (JP) .............................. JP2018-176437

(51) Int. Cl.
*G06F 11/20* (2006.01)
*G06F 3/06* (2006.01)

(52) U.S. Cl.
CPC ........ *G06F 11/2094* (2013.01); *G06F 3/0619* (2013.01); *G06F 3/0644* (2013.01); *G06F 3/0659* (2013.01); *G06F 3/0673* (2013.01); *G06F 2201/82* (2013.01)

(58) Field of Classification Search
CPC .. G06F 11/2094; G06F 3/0619; G06F 3/0644; G06F 3/0659; G06F 3/0673; G06F 2201/82
See application file for complete search history.

(56) References Cited

U.S. PATENT DOCUMENTS

| | | | | |
|---|---|---|---|---|
| 4,924,330 | A * | 5/1990 | Seamons | G11B 11/10517 360/66 |
| 6,502,174 | B1 * | 12/2002 | Beardsley | G06F 12/0866 707/999.202 |
| 7,800,856 | B1 * | 9/2010 | Bennett | G11B 21/12 360/75 |
| 8,799,573 | B2 * | 8/2014 | Kawaguchi | G06F 3/0689 711/114 |
| 2005/0138530 | A1 * | 6/2005 | Huang | H03M 13/6362 714/774 |
| 2009/0172344 | A1 * | 7/2009 | Grochowski | G06F 12/145 711/207 |
| 2010/0325478 | A1 * | 12/2010 | Maeda | G06F 11/2094 714/6.12 |
| 2011/0271048 | A1 * | 11/2011 | Fuji | G06F 11/1441 711/113 |
| 2019/0034302 | A1 * | 1/2019 | Anderson | G06F 12/0813 |

FOREIGN PATENT DOCUMENTS

JP    2011-003046 A    1/2011

* cited by examiner

*Primary Examiner* — Matthew M Kim
*Assistant Examiner* — Matthew N Putaraksa
(74) *Attorney, Agent, or Firm* — Volpe Koenig

(57) ABSTRACT

An I/O result receiving unit receives, from a storage device control unit, a result of I/O to a logical device with respect to an I/O request from an I/O control unit, a format target determining unit considers a failed track to be a format target when the failed track corresponds to a control area or an unallocated area, and a format requesting unit requests the storage device control unit to format a storage area of storage devices which corresponds to a page allocated to the failed track having been considered a format target.

9 Claims, 15 Drawing Sheets

FIG. 4
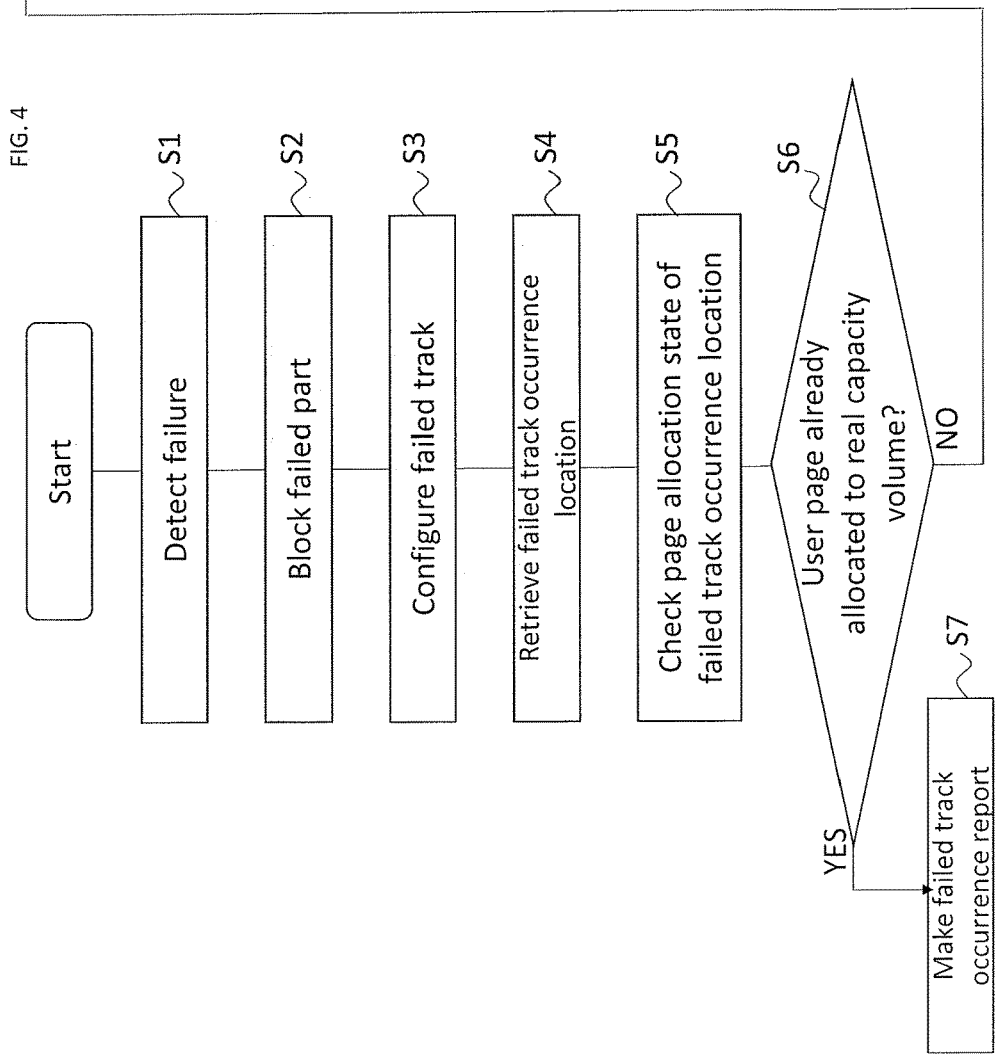
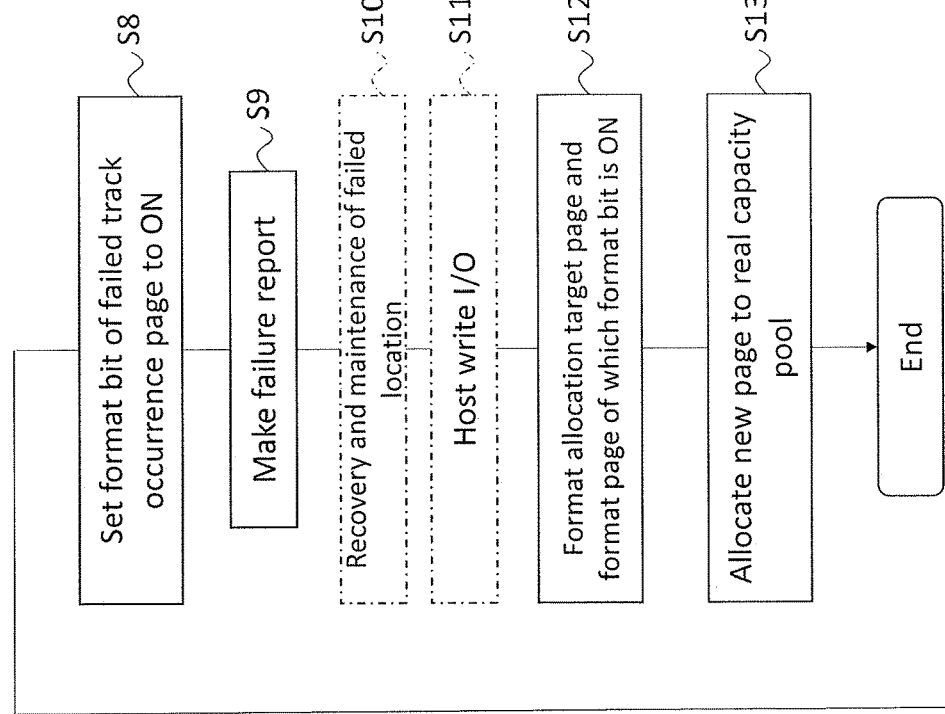

FIG. 9

| Track position | Track #C0 | Track #C1 | Track #C2 | Track #C3 | Track #CN |
|---|---|---|---|---|---|
| Track status | Normal | Normal | Storage device failure | Storage device failure | Normal |
| Allocated page #H | Page #H0 (User data) | Page #H0 (User data) | Page #H1 (Control area) | Page #H1 (Control area) | Unallocated |
| Volume #P | Volume #P0 | Volume #P0 | Volume #P1 | Volume #P1 | Volume #P0 |

FIG. 10

| Volume #P | Volume #P0 | Volume #P1 |
|---|---|---|
| Volume type | POOL-VOL | POOL-VOL |
| External volume path #R | Logical device #R0 | Logical device #R1 |

FIG. 11

| Page #H | Page #H0 | Page #H1 |
|---|---|---|
| Page type | User data | Control area |
| Format bitmap | OFF | ON |
| Volume #P | Volume #P0 | Volume #P1 |

FIG. 12

| External volume path #R | Logical device #R0 | Logical device #R1 |
|---|---|---|
| Logical device status | Normal | Failed |
| Device group #G | Device group #G0 | Device group #G1 |

FIG. 14

| Storage device #D | Storage device #D0 | Storage device #D1 | Storage device #D2 | Storage device #D3 |
|---|---|---|---|---|
| Status | Failed | Failed | Normal | Normal |

STORAGE CONTROL APPARATUS AND RECOVERY METHOD OF A FAILED TRACK

CROSS-REFERENCE TO RELATED APPLICATIONS

This application is based upon and claims the benefit of priority from Japanese Patent Application No. 2018-176437, filed on Sep. 20, 2018; the entire contents of all of which are incorporated herein by reference.

FIELD

The present invention relates to a storage control apparatus and a recovery method of a failed track.

BACKGROUND

Scale-out storages are garnering attention from the perspective of convenience in expansion and management of storage capacity. In scale-out storages, resources of a plurality of physical storages are integrated as a logical real capacity pool, and a virtual capacity volume is allocated from the real capacity pool in response to a request from a host.

Japanese Patent Application Publication No. 2011-3046 discloses a technique for managing a logical volume provided in a virtual volume realized by a plurality of disk apparatuses that manage redundant data in a distributed manner, in which when an abnormality is detected in an area of the virtual volume, a determination is made as to whether or not the area is an area in which the logical volume is allocated, and when an abnormality is detected in an area in which the logical volume of the virtual volume is not allocated, the area is initialized.

SUMMARY

However, when a write request from a host is received at a storage apparatus, a write to a physical storage is performed asynchronously with the write request. At this point, in the storage apparatus, the write to the physical storage may fail and a write may not be normally performed to the physical storage with respect to the write request from the host.

In addition, while the technique disclosed in Japanese Patent Application Publication No. 2011-3046 concerns a failure in any one disk apparatus in a RAID (Redundant Array of Inexpensive Disks) system and realizes recovery of data of the failed disk apparatus from redundant data stored in another normal disk apparatus, there is no mention of a recovery method with respect to an area in a physical storage to which a write cannot be normally performed.

The present invention has been made in consideration of the circumstances described above and an object thereof is to provide a storage control apparatus and a recovery method of a failed track which enable recovery of an area to which a write cannot be normally performed in a physical storage without losing data which cannot be self-reconstructed.

In order to achieve the object described above, a storage control apparatus according to a first aspect writes data cached in track units to a physical storage, a track being a minimum unit during caching, wherein the storage control apparatus: determines whether a failed track in which a failure has occurred during writing to the physical storage corresponds to a control area or an unallocated area; and, formats, when the failed track corresponds to the control area or the unallocated area, a storage area of the physical storage corresponding to the control area or the unallocated area.

According to the present invention, an area to which a write cannot be normally performed in a physical storage can be recovered without losing data which cannot be self-reconstructed.

BRIEF DESCRIPTION OF THE DRAWINGS

FIG. 4 is a flow chart showing operations from an occurrence to recovery of a failed track of a storage control apparatus according to the embodiment;

FIG. 9 is a diagram showing an example of an on-cache track management table shown in FIG. 1;

FIG. 10 is a diagram showing an example of a volume management table shown in FIG. 1;

FIG. 11 is a diagram showing an example of a page management table shown in FIG. 1;

FIG. 12 is a diagram showing an example of a logical device management table shown in FIG. 1;

FIG. 14 is a diagram showing an example of a storage device management table shown in FIG. 1.

DETAILED DESCRIPTION OF THE EMBODIMENT

An embodiment will be described with reference to the drawings. It should be noted that the embodiment described below is not intended to limit the invention as set forth in the accompanying claims and that all of the elements and combinations thereof described in the embodiment are not necessarily essential to solutions proposed by the invention.

Figure 1:
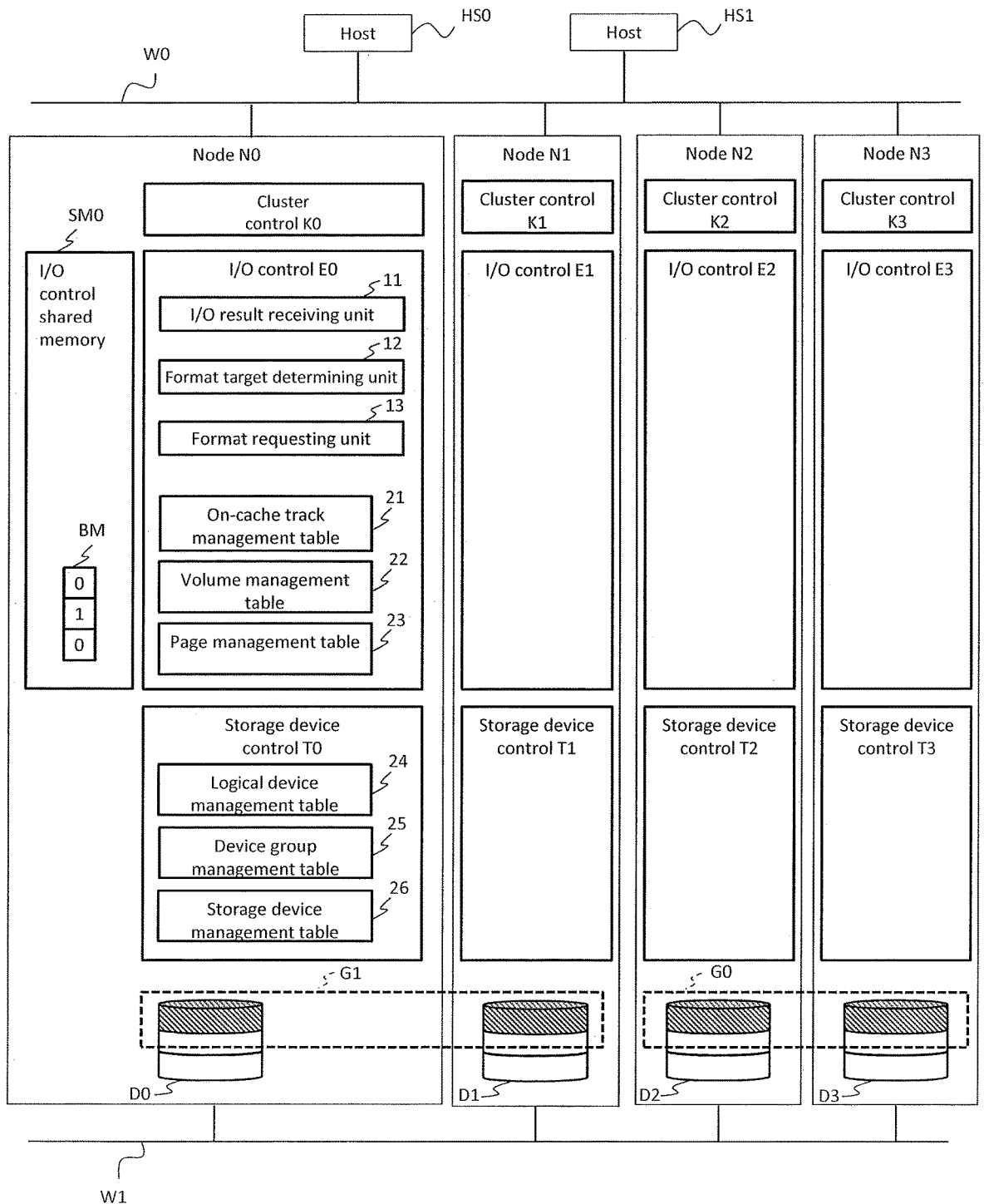
FIG. 1 is a block diagram showing a configuration of a storage system to which a storage control apparatus according to an embodiment is applied.

FIG. 1 is a block diagram showing a configuration of a storage system to which a storage control apparatus according to the embodiment is applied. While a scale-out storage is exemplified in the following description, other storages such as a scale-up storage may be used instead. The embodiment described below can be used in an SDS (Software Defined Storage).

In FIG. 1, the storage system includes nodes N0 to N3. The nodes N0 to N3 can be provided in a network-type storage environment such as an SAN (Storage Area Network) or an NAS (Network Attached Storage). Each of the nodes N0 to N3 is provided in, for example, a server. The number of nodes can be arbitrarily configured within a range of, for example, several tens to several thousands. Each of the nodes N0 to N3 is coupled to hosts HS0 via a public network W0. In addition, the respective nodes N0 to N3 are coupled to each other via a cluster network W1.

The respective nodes N0 to N3 include cluster control units K0 to K3, I/O control units E0 to E3, storage device control units T0 to T3, and storage devices D0 to D3. The node N0 includes an I/O control shared memory SM0. Although the nodes N1 to N3 also include I/O control shared memories, the I/O control shared memories of the nodes N1 to N3 are omitted in FIG. 1.

Each of the cluster control units K0 to K3 manages correspondences between a volume allocated to each of the hosts HS0 and the nodes N0 to N3. In this case, each of the hosts HS0 is capable of recognizing all of the nodes N0 to N3 in an integrated manner.

Each of the storage devices D0 to D3 is a storage device that physically stores data. Each of the storage devices D0 to D3 is, for example, an SSD (Solid State Drive) or a hard disk apparatus. The storage devices D0 to D3 may be provided in plurality for each of the nodes N0 to N3. The storage devices D0 to D3 have been made redundant. For example, storage areas of the storage devices D0 to D3 are grouped into device groups G0 and G1. In this case, storage areas of the storage devices D2 and D3 can be allocated to the device group G0 and storage areas of the storage devices D0 and D1 can be allocated to the device group G1. In this case, for example, in the device group G1, the storage device D0 can be treated as a device (master) and the storage device D1 can be treated as a device (mirror). The device (mirror) is a physical storage made redundant with respect to the device (master).

Based on a request from each of the I/O control units E0 to E3, each of the storage device control units T0 to T3 writes data cached in the I/O control shared memory into each of the storage devices D0 to D3. In this case, each of the storage device control units T0 to T3 controls the storage device control units T0 to T3 of a destination of redundancy. In addition, each of the storage device control units T0 to T3 makes the data cached in the I/O control shared memory redundant by writing the data into the device (master) and, at the same time, requesting the storage device control units T0 to T3 of the destination of redundancy to write the data in the device (mirror).

The storage device control unit T0 includes a logical device management table 24, a device group management table 25, and a storage device management table 26.

The logical device management table 24 holds a correspondence between the device groups G0 and G1 and a logical device together with a logical device status. The logical device status is capable of indicating whether a logical device is in a normal state or a failed state.

The device group management table 25 holds information indicating which of the device groups G0 and G1 includes each of the storage devices D0 to D3. The storage device management table 26 is capable of indicating whether each of the storage devices D0 to D3 is in a normal state or a failed state.

Each of the storage device control units T1 to T3 can also be configured in a similar manner to the storage device control unit T0.

Each of the I/O control units E0 to E3 transmits and receives data to and from a cache. In this case, each of the I/O control units E0 to E3 caches data in track units. A track represents a minimum unit of data during caching. In addition, each of the I/O control units E0 to E3 requests each of the storage device control units T0 to T3 to write the data cached in track units into each of the storage devices D0 to D3. Furthermore, each of the I/O control units E0 to E3 performs route management to each of the storage devices D0 to D3 with respect to an I/O (input/output) request from each of the hosts HS0 and also performs remaining capacity management.

In addition, each of the I/O control units E0 to E3 manages, in page units, whether or not the storage devices D0 to D3 are to be formatted with respect to an I/O request from each of the hosts HS0. A page represents a minimum unit when virtually allocating a storage area of the storage devices D0 to D3 to each of the hosts HS0. When formatting the storage devices D0 to D3, each of the I/O control units E0 to E3 writes format data into a cache memory and further requests each of the storage device control units T0 to T3 to write the format data into the storage devices D0 to D3.

In this case, the caching of data by each of the I/O control units E0 to E3 and the write of data to each of the storage devices D0 to D3 are executed asynchronously with a write request from each of the hosts HS0. When a failure occurs during writing to each of the storage devices D0 to D3 after data is cached by each of the I/O control units E0 to E3, each of the I/O control units E0 to E3 manages a track in which the failure had occurred as a failed track. In addition, when the failed track corresponds to a control area or an unallocated area, each of the I/O control units E0 to E3 requests each of the storage device control units T0 to T3 to format a storage area of each of the storage devices D0 to D3 which corresponds to the control area or the unallocated area.

In this case, each of the I/O control units E0 to E3 integrates physical capacities of the respective storage devices D0 to D3 as a logical real capacity pool. In addition, a virtual capacity volume can be extracted from the real capacity pool with respect to a volume allocated to each of the hosts HS0.

The I/O control unit E0 includes an I/O result receiving unit 11, a format target determining unit 12, a format requesting unit 13, an on-cache track management table 21, a volume management table 22, and a page management table 23.

The I/O result receiving unit 11 receives, from the storage device control unit T0, a result of I/O to a logical device in response to an I/O request from the I/O control unit E0. In this case, the I/O control unit E0 is capable of managing each of the device groups G0 and G1 as a logical device. In addition, the I/O control unit E0 is capable of allocating a pool volume to each logical device and integrating the pool volumes into the real capacity pool.

The format target determining unit 12 determines whether or not a failed track is a format target based on a data type of the failed track. In this case, when the failed track corresponds to a control area or an unallocated area, the format target determining unit 12 considers the failed track a format target. When the failed track corresponds to user data, the failed track is considered a non-format target. The format requesting unit 13 requests the storage device control unit T0 to format a storage area of the storage devices D0 to D3 which corresponds to a page allocated to the failed track having been considered a format target.

The on-cache track management table 21 holds a correspondence among a track, a page, and a pool volume together with a track status. The track status is capable of indicating whether a track is in a normal state or a failed state.

The volume management table 22 holds a correspondence between a pool volume and a logical device together with a volume type. As the volume type, a normal volume can be provided in addition to a pool volume. A pool volume is integrated into the real capacity pool and a volume is allocated to each of the hosts HS0 from the real capacity pool. A normal volume is allocated to each of the hosts HS0 without being integrated into the real capacity pool.

The page management table 23 holds a correspondence between a page and a pool volume together with a page type. The page type is capable of indicating whether a page is user data or a control area. In addition, the page management table 23 holds an ON/OFF state of a format bitmap BM of each page. A control area is capable of managing a position of a virtual capacity volume in a real capacity pool, a position of the virtual capacity volume in a storage device, an amount of use of the real capacity pool, and the like.

Each of the I/O control units E1 to E3 can also be configured in a similar manner to the I/O control unit E0.

The I/O control shared memory SM0 provides a shared memory when a parallel process is performed by the I/O control unit E0. In addition, the I/O control shared memory SM0 includes a cache for temporarily holding write data to the storage devices D0 to D3. Furthermore, the I/O control shared memory SM0 includes a format bitmap BM. The format bitmap BM stores information indicating whether or not the storage devices D0 to D3 are to be formatted in page units. In this case, a bit position corresponding to an unformatted page can be configured to 1 and a bit position corresponding to a formatted page can be configured to 0.

The I/O control shared memory of each of the nodes N1 to N3 can be configured in a similar manner. Alternatively, the format bitmap BM may be provided in the storage device control unit T0.

Figure 2:
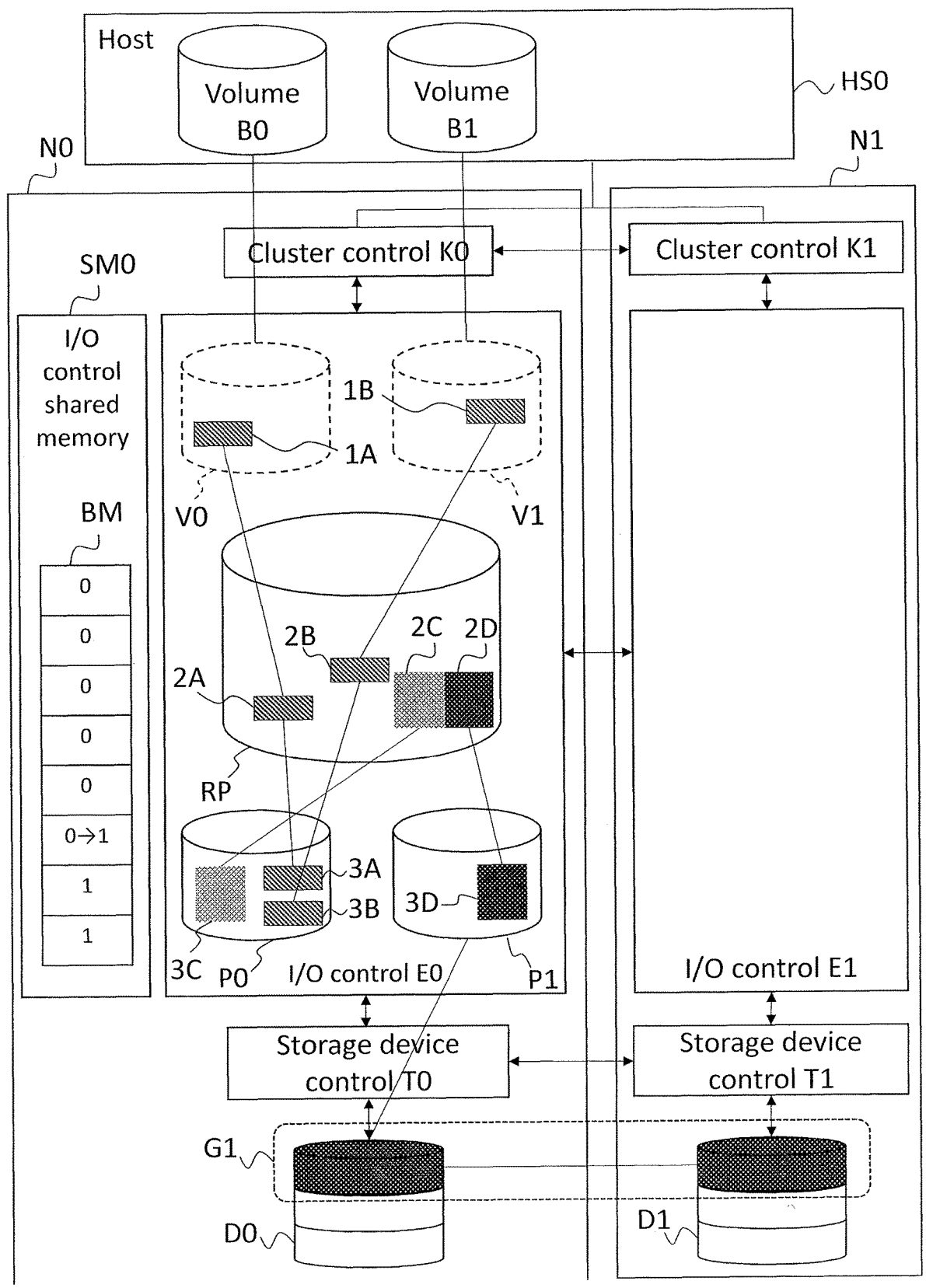
FIG. 2 is a block diagram showing a state during an occurrence of a failed track of a storage control apparatus according to the embodiment.

FIG. 2 is a block diagram showing a state during an occurrence of a failed track of the storage control apparatus according to the embodiment.

In FIG. 2, it is assumed that the I/O control unit E0 generates a pool volume P0 with respect to the device group G0 shown in FIG. 1 and generates a pool volume P1 with respect to the device group G1 shown in FIG. 1. In this case, the I/O control unit E0 integrates the pool volumes P0 and P1 into a real capacity pool RP.

It is assumed that volumes B0 and B1 are allocated to the host HS0 as capacities usable by the host HS0. In this case, the I/O control unit E0 extracts virtual capacity volumes V0 and V1 from the real capacity pool RP in correspondence with the respective volumes B0 and B1.

Assuming that user data 1A is allocated to the virtual capacity volume V0, the I/O control unit E0 is capable of associating the user data 1A with user data 2A in the real capacity pool RP, associating the user data 2A with user data 3A in the pool volume P0, and associating the user data 3A with the device group G0.

In addition, assuming that user data 1B is allocated to the virtual capacity volume V1, the I/O control unit E0 is capable of associating the user data 1B with user data 2B in the real capacity pool RP, associating the user data 2B with user data 3B in the pool volume P0, and associating the user data 3B with the device group G0.

In addition, assuming that the I/O control unit E0 has allocated a control area 2C to the real capacity pool RP, the I/O control unit E0 is capable of associating the control area 2C with a control area 3C of the pool volume P0 and associating the control area 3C with the device group G0.

In addition, assuming that the I/O control unit E0 has allocated a control area 2D to the real capacity pool RP, the I/O control unit E0 is capable of associating the control area 2D with a control area 3D of the pool volume P1 and associating the control area 3D with the device group G1.

Furthermore, it is assumed that the I/O control unit E0 has requested the storage device control unit T0 to write data of the control area 3D into the device group G1. In this case, when it is assumed that writes to both the device (master) and the device (mirror) of the device group G1 have failed, the storage device control unit T0 sends a failure response to the I/O control unit E0.

When the I/O control unit E0 receives a failure response of the device group G1 from the storage device control unit T0, the I/O control unit E0 specifies a page of the control area 3D included in the pool volume P1 corresponding to the device group G1 and sets a bit position (referred to as a format bit) of the format bitmap BM corresponding to the page to ON. When a bit position of the format bitmap BM is set to ON, a value of the bit position is changed from 0 to 1.

When there is a failure response of the device group G1, a user performs a recovery of a failed part of the device group G1 to prevent a failure response of the device group G1 from being made during writing to the device group G1. The recovery of the failed part of the device group G1 may involve a physical operation such as replacement of a drive.

Figure 3:
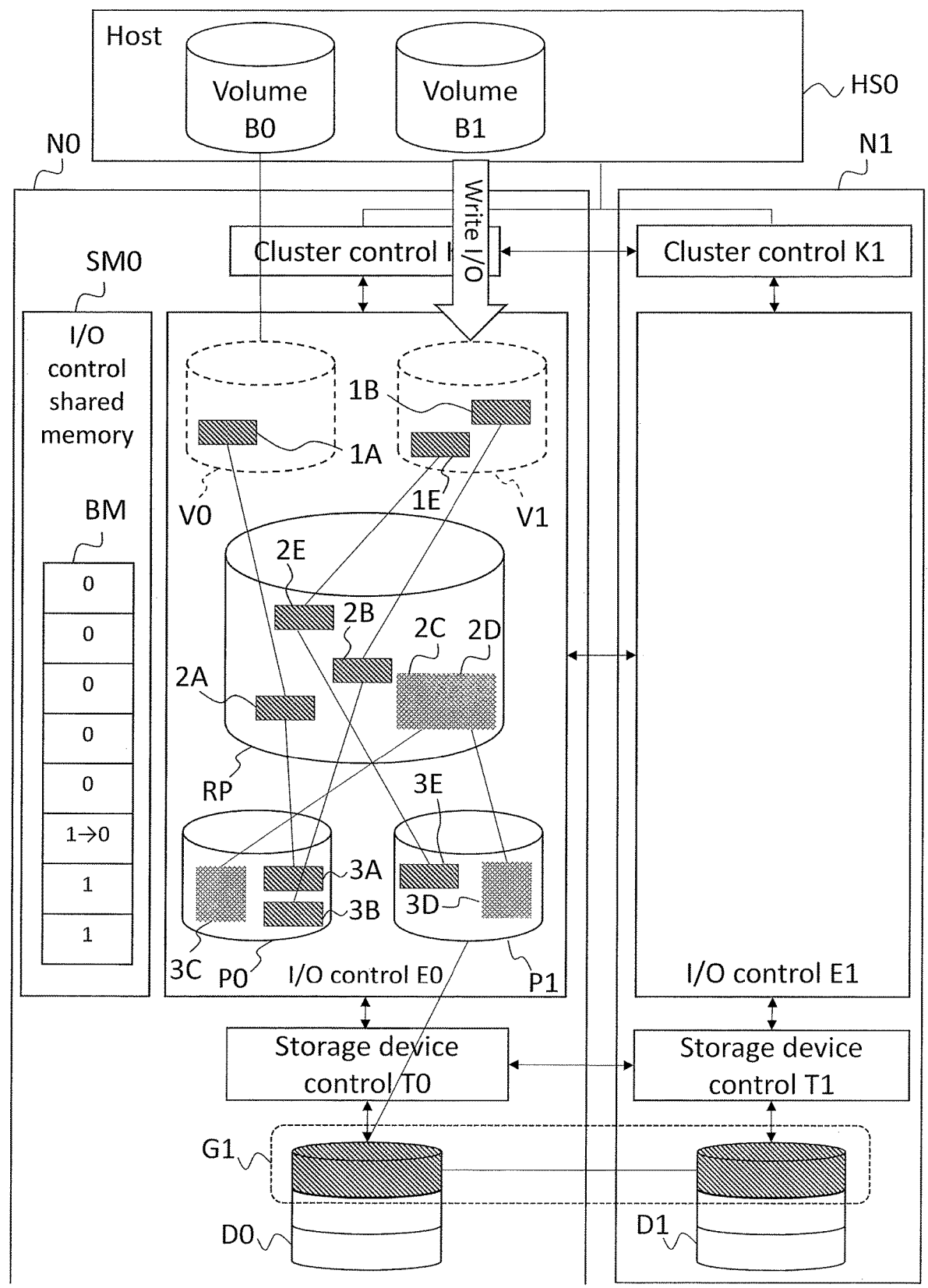
FIG. 3 is a block diagram showing a state during recovery of a failed track of a storage control apparatus according to the embodiment.

FIG. 3 is a block diagram showing a state during recovery of a failed track of the storage control apparatus according to the embodiment.

In FIG. 3, it is assumed that after recovery of the failed part of the device group G1 has been performed, a write request is issued from the host HS0.

In this case, the I/O control unit E0 refers to the format bitmap BM and checks a bit position with a value of 1. In addition, the I/O control unit E0 checks a page to be a format target based on the bit position with a value of 1 and requests the storage device control unit T0 to format the device group G1 corresponding to the pool volume P1 which includes the page. At this point, the storage device control unit T0 formats both the device (master) and the device (mirror) of the device group G1.

Furthermore, it is assumed that the I/O control unit E0 has allocated user data 1E designated by a write request from the host HS0 to the virtual capacity volume V0. In this case, the I/O control unit E0 is capable of associating the user data 1E with user data 2E in the real capacity pool RP, associating the user data 2E with user data 3E in the pool volume P1, and associating the user data 3E with the device group G1.

In this case, when a failed track occurs, the I/O control unit E0 is capable of recovering the failed track without losing user data by formatting a storage area to which a failed track corresponding to a control area or an unallocated area has been allocated. Therefore, even when the real capacity pool RP and the pool volumes P0 and P1 are hidden from the host HS0 and the user is only capable of being aware of the virtual capacity volumes V0 and V1, the failed track can be autonomously recovered and the real capacity pool RP and the pool volumes P0 and P1 can be maintained while ensuring EoU (Ease of Use) of the user.

In addition, in the I/O control unit E0, by performing format management of the failed track using the format bitmap BM having been prepared to begin with for formatting in response to I/O requests from the hosts HS0 and HS1, there is no longer a need to provide a format bitmap dedicated to format management of a failed track.

Furthermore, by executing formatting of a failed track in response to I/O requests from the hosts HS0 and HS1, the I/O control unit E0 is capable of executing, in response to I/O requests from the hosts HS0 and HS1, formatting of the failed track according to an I/O sequence of formatting having been prepared to begin with.

FIG. 4 is a flow chart showing operations from an occurrence to recovery of a failed track of the storage control apparatus according to the embodiment.

In FIG. 4, the storage device control unit T0 shown in FIG. 1 detects a failure of the storage devices D0 to D3 (S1). In the failure detection, whether or not writes to both the device (master) and the device (mirror) fail is detected when the storage device control unit T0 shown in FIG. 1 attempts writes to a device group designated by the I/O control unit E0 shown in FIG. 1.

Next, the storage device control unit T0 performs blocking of a failed part (S2). In the blocking of the failed part, the storage device control unit T0 configures a status of the storage device in which the failure was detected in the storage device management table 26 shown in FIG. 1 to failed. In addition, the storage device control unit T0 refers to the device group management table 25 and specifies a device group including the storage device in which the failure was detected. Subsequently, the storage device control unit T0 configures a logical device status of a logical device corresponding to the device group in the logical device management table 24 to failed.

Next, the storage device control unit T0 returns, to the I/O control unit E0, an error response to the effect that a write to the logical device corresponding to the device group designated by the I/O control unit E0 has failed. Upon receiving an error response with respect to the logical device, the I/O control unit E0 configures a failed track (S3). In the configuration of the failed track, the I/O control unit E0 refers to the volume management table 22 and specifies a pool volume corresponding to the logical device. In addition, the I/O control unit E0 configures a track status of a track allocated to a page corresponding to the pool volume in the on-cache track management table 21 to failed.

Next, the I/O control unit E0 retrieves a failed track occurrence location (S4). In the retrieval of the failed track occurrence location, the I/O control unit E0 refers to the on-cache track management table 21 and specifies a page allocated to the failed track.

Next, the I/O control unit E0 checks a page allocation state of the failed track occurrence location (S5). In the checking of the page allocation state of the failed track occurrence location, the I/O control unit E0 refers to the page management table 23 and checks a page type of the page allocated to the failed track. When the page allocated to the failed track is a page of user data already allocated to the real capacity pool (YES in S6), the I/O control unit E0 makes a failed track occurrence report (S7).

On the other hand, when the page allocated to the failed track is a page unallocated to the real capacity pool or a page of a control area (NO in S6), the I/O control unit E0 sets the bit position of the format bitmap BM corresponding to the page to ON (S8).

Next, the I/O control unit E0 makes a failure report to the user (S9). In the failure report, the I/O control unit E0 is capable of notifying a track status of the failed track managed by the on-cache track management table 21.

Next, the user performs recovery and maintenance of the failed part (S10). The recovery of the failed part is an operation for preventing an error response from being returned when an I/O request to the storage devices D0 to D3 is made. The recovery of the failed location may involve a physical operation such as replacement of a drive.

Next, assuming that a write request has been made from the host HS0 (S11), the I/O control unit E0 requests the storage device control unit T0 to format an allocate target page and a page the format bit of which is ON (S12). In the format request of a page the format bit of which is ON, the I/O control unit E0 refers to the page management table 23 to specify a pool volume corresponding to the page, the format bit of which is ON, and refers to the volume management table 22 to specify a logical device corresponding to the pool volume. In addition, the I/O control unit E0 requests the storage device control unit T0 to format the logical device.

Next, the I/O control unit E0 allocates a new page corresponding to the write request from the host HS0 to the real capacity pool (S13).

Hereinafter, the operations from an occurrence to recovery of a failed track of the storage control apparatus shown in FIG. 1 will be described with specificity.

Figure 5:
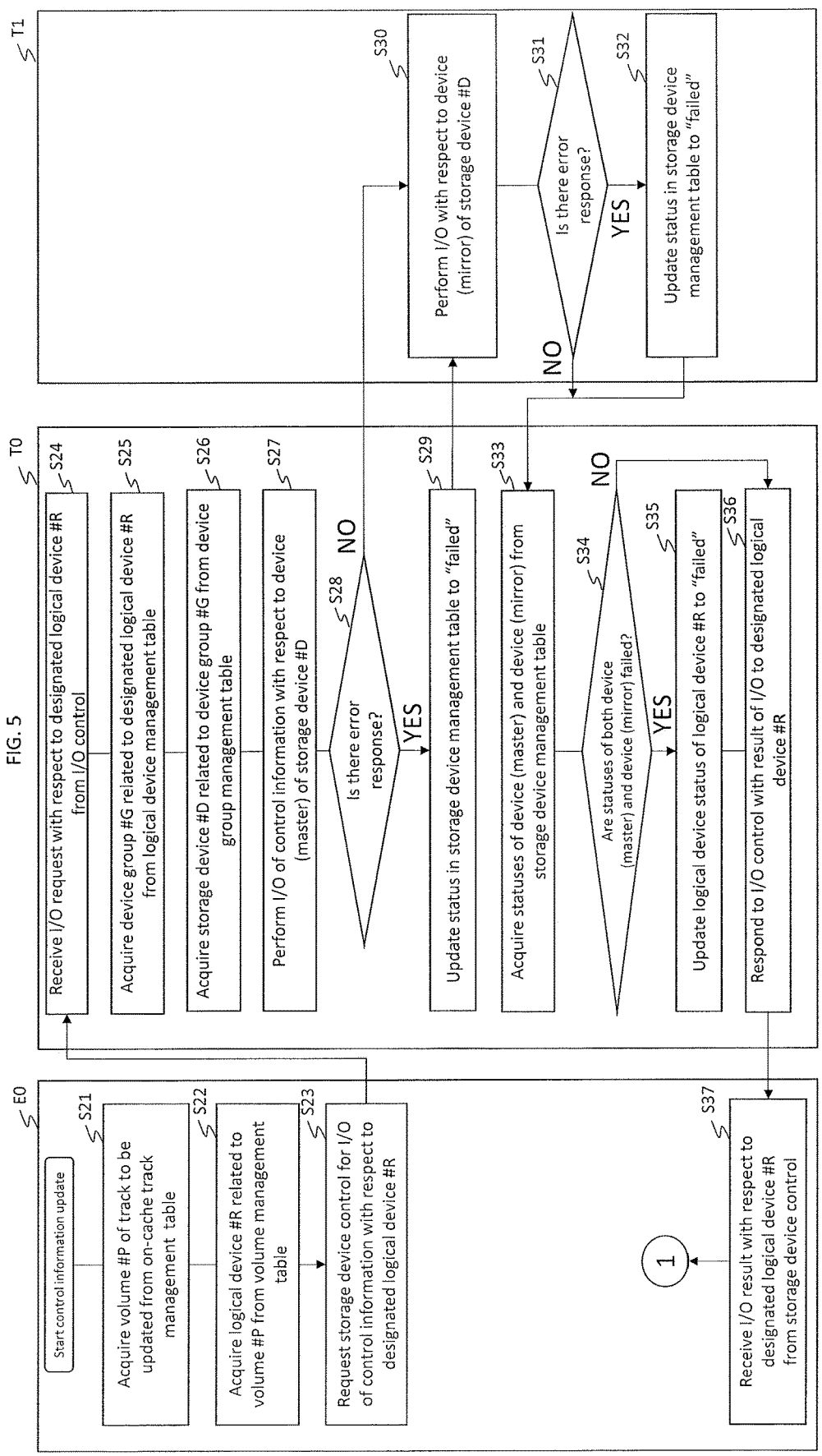
FIG. 5 is a flow chart showing a control information update process during an occurrence of a failed track of a storage control apparatus according to the embodiment.
Figure 6:
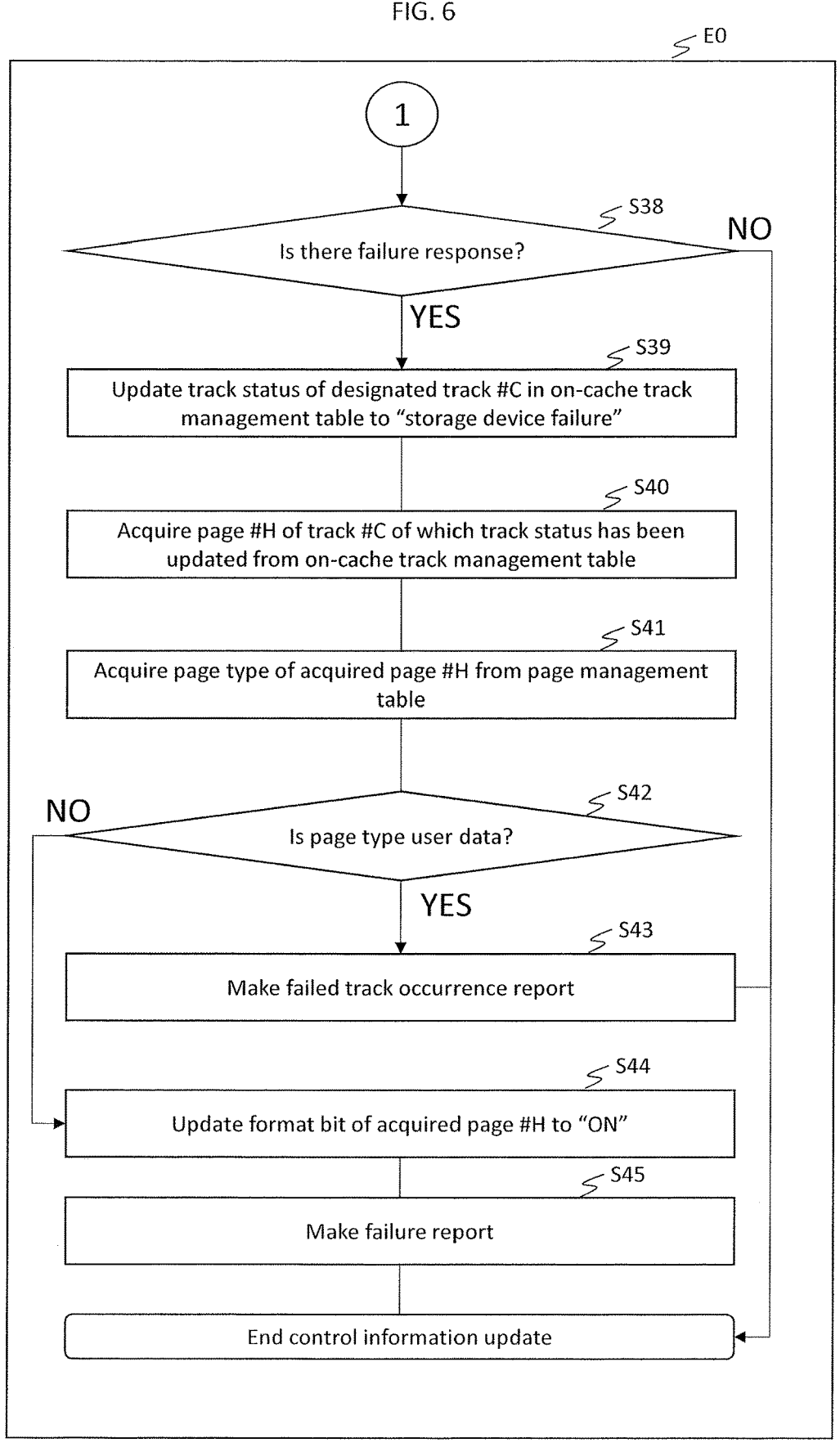
FIG. 6 is a flow chart showing a control information update process during an occurrence of a failed track of a storage control apparatus according to the embodiment.

FIGS. 5 and 6 are flow charts showing a control information update process during an occurrence of a failed track of the storage control apparatus according to the embodiment.

In FIG. 5, when the I/O control unit E0 shown in FIG. 1 starts the control information update process, the I/O control unit E0 acquires a volume #P of a track to be updated from the on-cache track management table 21 (S21). In this case, #P is an identifier for identifying the pool volumes P0 and P1 shown in FIG. 1.

Next, the I/O control unit E0 acquires a logical device #R related to the volume #P from the volume management table 22 (S22). In this case, #R is an identifier for identifying a logical device.

Next, the I/O control unit E0 requests the storage device control unit T0 to perform I/O of control information with respect to the designated logical device #R (S23).

Next, the storage device control unit T0 receives the I/O request for control information with respect to the designated logical device #R from the I/O control unit E0 (S24).

Next, the storage device control unit T0 acquires a device group #G related to the designated logical device #R from the logical device management table 24 (S25). In this case, #G is an identifier for identifying the device groups G0 and G1 shown in FIG. 1.

Next, the storage device control unit T0 acquires a storage device #D related to the device group #G from the device group management table 25 (S26). In this case, #D is an identifier for identifying the storage devices D0 to D3 shown in FIG. 1.

Next, the storage device control unit T0 performs I/O of control information with respect to the device (master) of the storage device #D (S27).

Next, the storage device control unit T0 determines whether or not there has been an error response from the device (master) of the storage device #D (S28). When there has been an error response, the storage device control unit T0 updates the status of the storage device #D in the storage device management table 26 to "failed" (S29).

On the other hand, when there has not been an error response from the device (master) of the storage device #D or when the process of S29 has been finished, the storage device control unit T0 requests the storage device control unit T1 to perform I/O of control information with respect to the device (mirror) of the storage device D.

When the storage device control unit T1 receives the I/O request for control information with respect to the device (mirror) of the storage device #D from the storage device control unit T0, the storage device control unit T1 performs I/O of control information with respect to the device (mirror) of the storage device #D (S30).

Next, the storage device control unit T1 determines whether or not there has been an error response from the device (mirror) of the storage device #D (S31). When there has been an error response, the storage device control unit T1 updates the status of the storage device #D in the storage device management table 26 to "failed" (S32).

When there has not been an error response in S31 or when the process of S32 has been finished, the storage device control unit T0 acquires statuses of the device (master) and the device (mirror) from the storage device management table 26 (S33).

Next, the storage device control unit T0 determines whether or not the status of the device (master) is failed and, at the same time, the status of the device (mirror) is failed (S34). When the status of the device (master) is failed and, at the same time, the status of the device (mirror) is failed, the logical device status of the logical device #R in the logical device management table 24 is updated to failed (S35).

On the other hand, when the condition of the status of the device (master) being failed and the status of the device (mirror) being failed is not satisfied, the storage device control unit T0 responds to the I/O control unit E0 with a result of the I/O to the designated logical device #R (S36).

Next, the I/O control unit E0 receives the I/O result of control information with respect to the designated logical device #R from the storage device control unit T0 (S37).

Next, in FIG. 6, the I/O control unit E0 determines whether or not a failure response of the designated logical device #R has been made (S38). When a failure response of the designated logical device #R has not been made, the I/O control unit E0 ends the control information update process.

On the other hand, when a failure response of the designated logical device #R has been made, the I/O control unit E0 acquires a volume #P related to the designated logical device #R from the volume management table 22. In addition, the I/O control unit E0 updates a track status of a track #C allocated to a page #H corresponding to the acquired volume #P in the on-cache track management table 21 to "storage device failure" (S39). In this case, #C is an identifier for identifying a track.

Next, the I/O control unit E0 acquires the page #H allocated to the track #C, the track status of which has been updated to "storage device failure", from the on-cache track management table 21 (S40). In this case, #H is an identifier for identifying a page.

Next, the I/O control unit E0 acquires a page type of the acquired page #H from the page management table 23 (S41).

Next, the I/O control unit E0 determines whether or not the page type of the acquired page # is user data (S42). When the page type of the acquired page # is user data, the I/O control unit E0 makes a failed track occurrence report (S43) and ends the control information update process.

On the other hand, when the page type of the acquired page # is not user data, the I/O control unit E0 updates the format bit of the acquired page # to "ON" (S44), and after making a failure report (S45), ends the control information update process.

Figure 7:
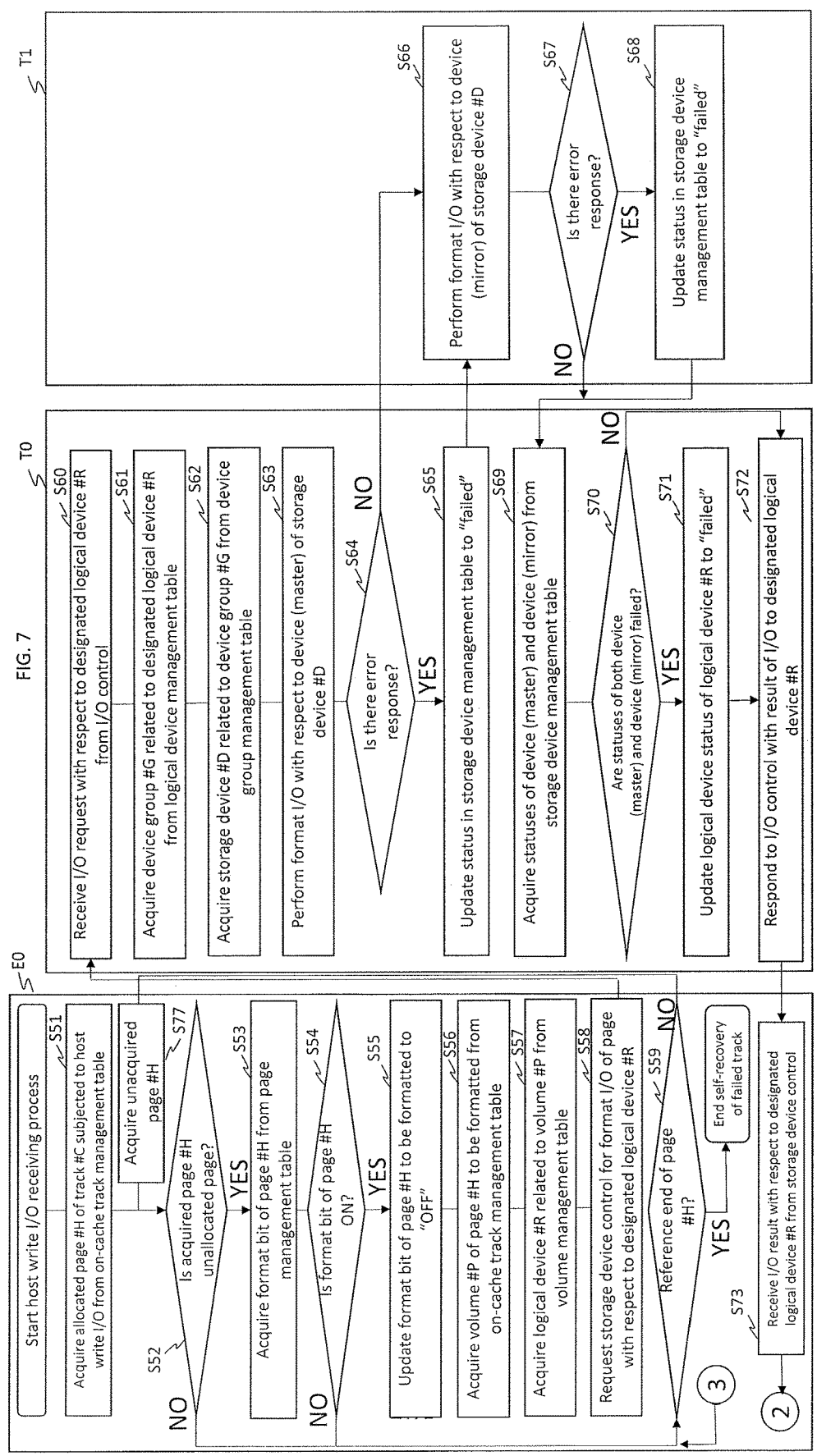
FIG. 7 is a flow chart showing a failed track recovery process of a storage control apparatus according to the embodiment.
Figure 8:
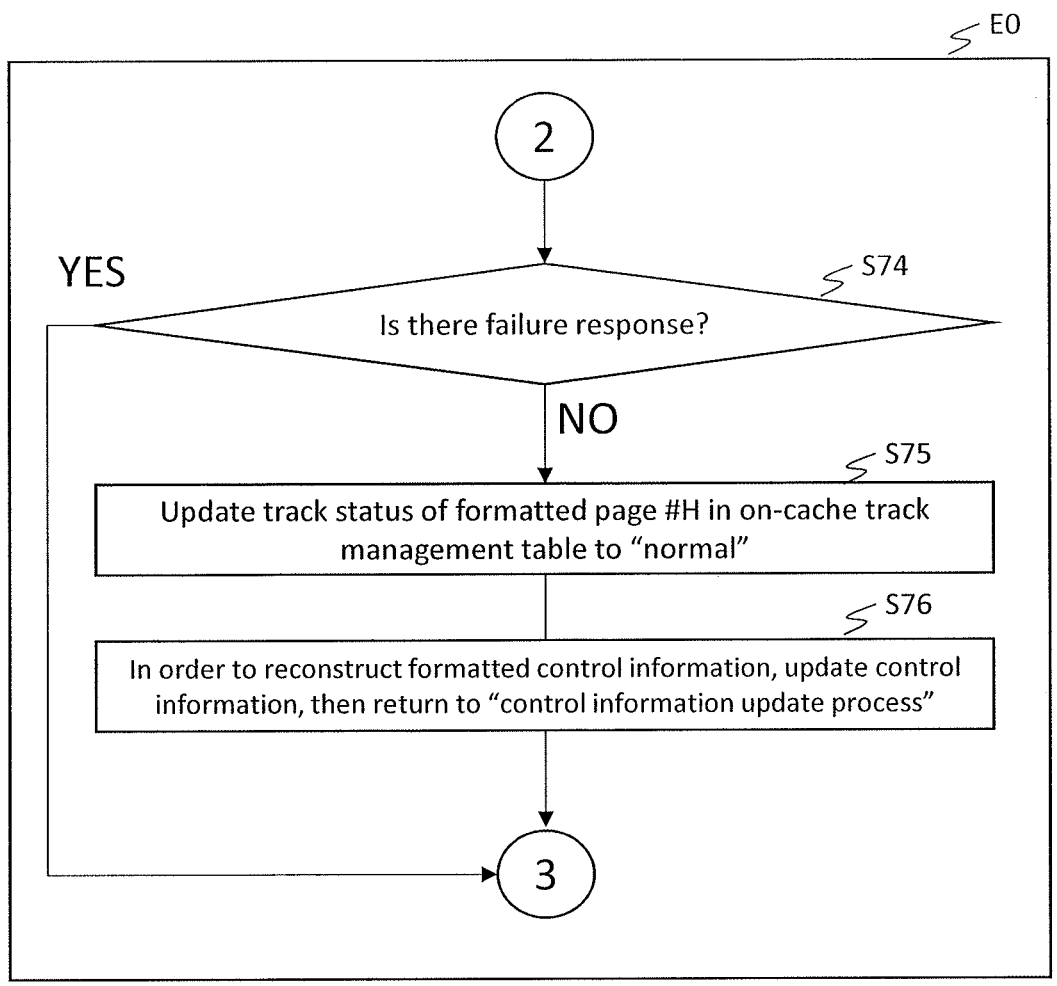
FIG. 8 is a flow chart showing a failed track recovery process of a storage control apparatus according to the embodiment.

FIGS. 7 and 8 are flow charts showing a failed track recovery process of the storage control apparatus according to the embodiment.

In FIG. 7, when the I/O control unit E0 shown in FIG. 1 starts a host write I/O receiving process, the I/O control unit E0 acquires an allocated page #H of a track #C subjected to host write I/O (a write request from the host HS0 shown in FIG. 3) from the on-cache track management table 21 (S51).

Next, the I/O control unit E0 determines whether or not the acquired page #H is an unallocated page (S52). When the acquired page #H is not an unallocated page, the I/O control unit E0 determines whether or not it is a reference end of the page #H (S59). When it is not the reference end of the page #H, the I/O control unit E0 acquires an unacquired page #H (S77) and returns to S52. When it is the reference end of the page #H, the I/O control unit E0 ends the self-recovery process of the failed track.

On the other hand, in S52, when the acquired page #H is an unallocated page, the I/O control unit E0 acquires a format bit of the page #H from the page management table 23 (S53).

Next, the I/O control unit E0 determines whether or not the format bit of the page #H is ON (S54). When the format bit of the page #H is not ON, the I/O control unit E0 advances to S59.

On the other hand, when the format bit of the page #H is ON, the I/O control unit E0 updates the format bit of the acquired page # to "OFF" (S55).

Next, the I/O control unit E0 acquires a volume #P of the page #H to be formatted from the on-cache track management table 21 (S56).

Next, the I/O control unit E0 acquires a logical device #R related to the volume #P from the volume management table 22 (S57).

Next, the I/O control unit E0 requests the storage device control unit T0 for a format of a page with respect to the designated logical device #R (S58).

Next, the storage device control unit T0 receives the format of a page with respect to the designated logical device #R from the I/O control unit E0 (S60).

Next, the storage device control unit T0 acquires a device group #G related to the designated logical device #R from the logical device management table 24 (S61).

Next, the storage device control unit T0 acquires a storage device #D related to the device group #G from the device group management table 25 (S62).

Next, the storage device control unit T0 performs format I/O with respect to the device (master) of the storage device #D (S63).

Next, the storage device control unit T0 determines whether or not there has been an error response from the device (master) of the storage device #D (S64). When there has been an error response, the storage device control unit T0 updates the status of the storage device #D in the storage device management table 26 to "failed" (S65).

On the other hand, when there has not been an error response from the device (master) of the storage device #D or when the process of S65 has been finished, the storage device control unit T0 requests the storage device control unit T1 to perform format I/O with respect to the device (mirror) of the storage device #D.

When the storage device control unit T1 receives the format I/O request with respect to the device (mirror) of the storage device #D from the storage device control unit T0, the storage device control unit T1 performs format I/O with respect to the device (mirror) of the storage device #D (S66).

Next, the storage device control unit T1 determines whether or not there has been an error response from the device (mirror) of the storage device #D (S67). When there has been an error response, the storage device control unit T1 updates the status of the storage device #D in the storage device management table 26 to "failed" (S68).

When there has not been an error response in S67 or when the process of S68 has been finished, the storage device control unit T0 acquires statuses of the device (master) and the device (mirror) from the storage device management table 26 (S69).

Next, the storage device control unit T0 determines whether or not the status of the device (master) is failed and, at the same time, the status of the device (mirror) is failed (S70). When the status of the device (master) is failed and, at the same time, the status of the device (mirror) is failed, the logical device status of the logical device #R in the logical device management table 24 is updated to failed (S71).

On the other hand, when the condition of the status of the device (master) being failed and the status of the device (mirror) being failed is not satisfied, the storage device control unit T0 responds to the I/O control unit E0 with a result of I/O to the designated logical device #R (S72).

Next, the I/O control unit E0 receives the format I/O result with respect to the designated logical device #R from the storage device control unit T0 (S73).

Next, in FIG. 8, the I/O control unit E0 determines whether or not a failure response of the designated logical device #R has been made (S74). When a failure response of the designated logical device #R has been made, the I/O control unit E0 returns to S59 in FIG. 7.

On the other hand, when a failure response of the designated logical device #R has not been made, the I/O control unit E0 acquires a volume #P related to the designated logical device #R from the volume management table 22. In addition, the I/O control unit E0 updates a track status of a page #H corresponding to the acquired volume #P in the on-cache track management table 21 to "normal" (S75).

Next, in order to reconstruct the formatted control information, the I/O control unit E0 updates the control information (S76) and returns to S59 in FIG. 7. In the update of the control information, the I/O control unit E0 returns to the control information update process shown in FIG. 5.

Hereinafter, using an example of a state during an occurrence of a failed track shown in FIG. 2, configuration examples of the on-cache track management table 21, the volume management table 22, the page management table 23, the logical device management table 24, the device group management table 25, and the storage device management table 26 shown in FIG. 1 will be described.

In the storage device management table 26 shown in FIG. 14, a status is configured for each storage device #D. When a failure of the storage devices D0 and D1 shown in FIG. 2 is detected, the statuses of the storage devices #D0 and #D1 in the storage device management table 26 are configured to failed.

Figure 13:
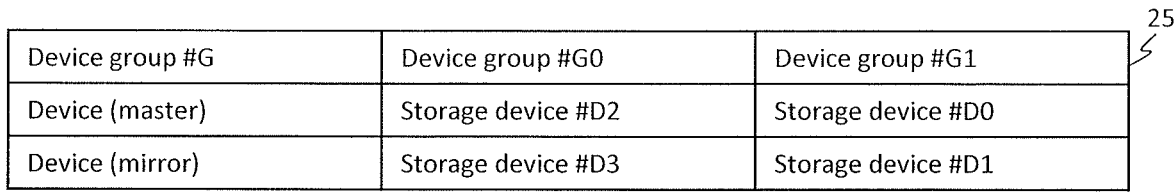
FIG. 13 is a diagram showing an example of a device group management table shown in FIG. 1.

In the device group management table 25 shown in FIG. 13, a device (master) and a device (mirror) are configured for each device group #G. In this case, in the device group #G0, a storage device #D2 is registered as the device (master) and a storage device #D3 is registered as the device (mirror). In the device group #G1, the storage device #D0 is registered as the device (master) and the storage device #D1 is registered as the device (mirror).

In the logical device management table 24 shown in FIG. 12, a logical device status is configured for each external volume path #R. In addition, in the logical device management table 24, device groups #G0 and #G1 corresponding to the respective logical devices #R0 and #R1 are registered.

When the statuses of the storage devices #D0 and #D1 in the storage device management table 26 shown in FIG. 14 are configured to failed, a determination that the storage devices #D0 and #D1 belong to the device group #G1 can be made by referring to the device group management table 25 shown in FIG. 13. Subsequently, the logical device status of the logical device #R1 corresponding to the device group #G1 in the logical device management table 24 is configured to failed.

In the volume management table 22 shown in FIG. 10, an external volume path #R corresponding to the volume #P is registered. In the volume management table 22, logical devices #R0 and #R1 are registered in correspondence to the respective volumes #P0 and #P1. In addition, a volume type is registered in correspondence to the volume #P in the volume management table 22. Volume types include POOL-VOL indicating a pool volume and a normal volume. In the volume management table 22, POOL-VOL is registered as the volume types of the respective volumes #P0 and #P1.

In the on-cache track management table 21 shown in FIG. 9, a track status is configured for each track position. In addition, in the on-cache track management table 21, an allocated page #H that is allocated to a track position and a volume #P corresponding to the allocated page #H are registered.

In the on-cache track management table 21, a page #H0 is allocated to tracks #C0 and #C1 and a page #H1 is allocated to tracks #C2 and #C3. In addition, the pages #H0 and #H1 are respectively associated with the volumes #P0 and #P1.

When the logical device status of the logical device #R1 in the logical device management table 24 shown in FIG. 12 is configured to failed, a determination that the logical device #R1 corresponds to the volume #P1 can be made by referring to the volume management table 22 shown in FIG. 10. In addition, the track statuses of the tracks #C2 and #C3 allocated to the page #H1 corresponding to the volume #P1 in the on-cache track management table 21 are configured to storage device failure.

In the page management table 23 shown in FIG. 11, a page type is registered for each page #H. Page types include an unallocated page and an allocated page. In addition, allocated pages include user data and a control area. In the page management table 23, user data is registered as the page type of the page #H0 and a control area is registered as the page type of the page #H1.

In addition, in the page management table 23, a volume #P corresponding to the page #H is registered. Furthermore, in the page management table 23, a format bitmap is configured to ON or OFF for each page #H.

In this case, the page #H1 allocated to the tracks #C2 and #C3, track statuses of which are configured as storage device failure, can be specified by referring to the on-cache track management table 21 shown in FIG. 9. In addition, when the page type of the page #H1 is a control area or an unallocated page in the page management table 23, the format bit corresponding to the page is configured to ON.

Figure 15:
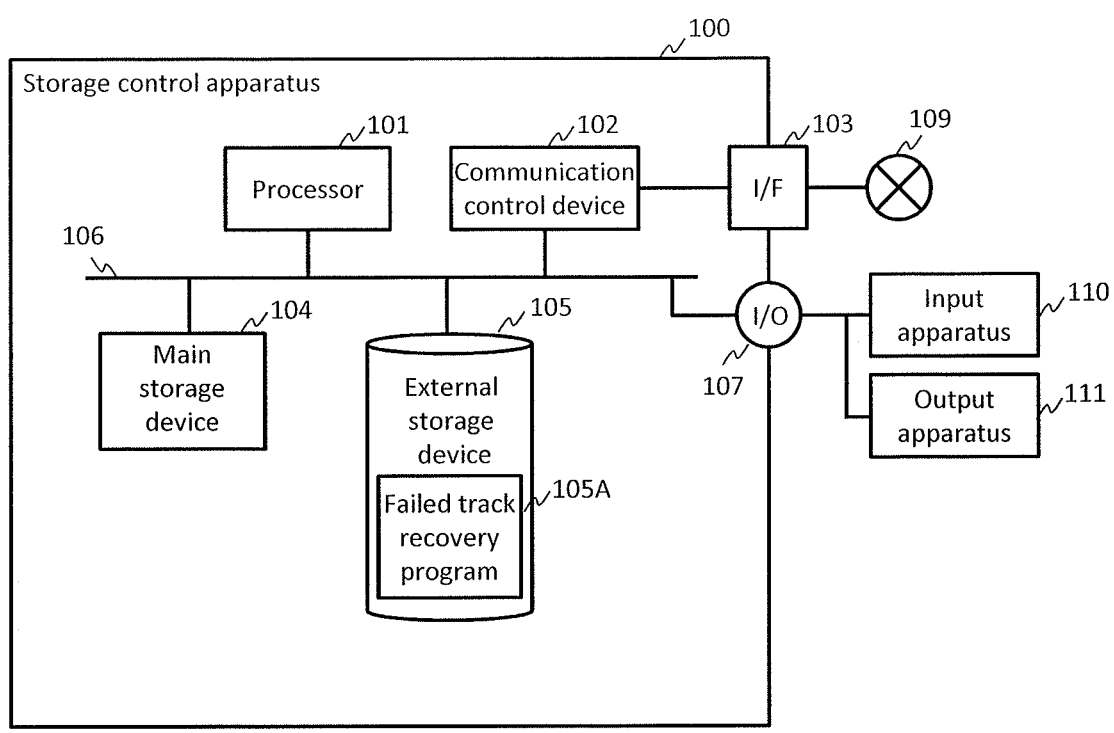
FIG. 15 is a block diagram showing a hardware configuration of a storage control apparatus according to the embodiment.

FIG. 15 is a block diagram showing a hardware configuration of a storage control apparatus according to the embodiment.

In FIG. 15, a storage control apparatus 100 is provided with a processor 101, a communication control device 102, a communication interface 103, a main storage device 104, and an external storage device 105. The processor 101, the communication control device 102, the communication interface 103, the main storage device 104, and the external storage device 105 are coupled to each other via an internal bus 106. The main storage device 104 and the external storage device 105 can be accessed from the processor 101.

In addition, an input apparatus 110 and an output apparatus 111 are provided outside of the storage control apparatus 100. The input apparatus 110 and the output apparatus 111 are coupled to the internal bus 106 via an input/output interface 107.

Examples of the input apparatus 110 include a keyboard, a mouse, a touch panel, a card reader, and an audio input apparatus. Examples of the output apparatus 111 include a screen display apparatus (such as a liquid crystal monitor, an organic EL (Electro Luminescence) display, or a graphic card), an audio output apparatus (such as a speaker), and a printing apparatus.

The processor 101 is hardware responsible for operation control of the entire storage control apparatus 100. The main storage device 104 can be constituted by, for example, a semiconductor memory such as an SRAM or a DRAM. A program currently being executed by the processor 101 can be stored in the main storage device 104 or a work area used by the processor 101 to execute the program can be provided in the main storage device 104.

The external storage device 105 is a storage device having a large storage capacity and examples thereof include a hard disk apparatus and an SSD (Solid State Drive). The external storage device 105 is capable of holding executable files of various programs and data to be used when executing the programs. A failed track recovery program 105A can be stored in the external storage device 105. The failed track recovery program 105A may be software that can be installed in the storage control apparatus 100 or may be built into the storage control apparatus 100 as firmware.

The communication control device 102 is hardware equipped with a function for controlling communication with the outside. The communication control device 102 is coupled to a network 109 via the communication interface 103. The network 109 may be a WAN (Wide Area Network) such as the Internet, a LAN (Local Area Network) such as the Ethernet or WiFi, or a combination of a WAN and a LAN.

The input/output interface 107 converts data input from the input apparatus 110 into a data format that can be processed by the processor 101 and converts data output from the processor 101 into a data format that can be output by the output apparatus 111.

By having the processor 101 read out the failed track recovery program 105A to the main storage device 104 and execute the failed track recovery program 105A, a determination can be made as to whether or not a failure has occurred during writing to a physical storage of data cached in track units, and when a failed track corresponds to a control area or an unallocated area, a storage area of the physical storage corresponding to the control area or the unallocated area can be formatted.

The execution of the failed track recovery program 105A may be shared among a plurality of processors or computers. Alternatively, the processor 101 may be configured to instruct a cloud computer or the like to execute all of or a part of the failed track recovery program 105A via the network 109 and to receive an execution result thereof.

What is claimed is:

1. A storage control apparatus configured to write data cached in track units to a physical storage, a track being a minimum unit during caching, the storage control apparatus comprising:
   a memory;
   a format bitmap for managing whether or not the physical storage is to be formatted in page units; and
   a processor communicatively coupled to the memory and the format bitmap, wherein the processor is configured to
   determine whether a failed track in which a failure has occurred during writing to the physical storage corresponds to a control area or an unallocated area; and
   format, when the failed track corresponds to the control area or the unallocated area, a storage area of the physical storage corresponding to the control area or the unallocated area,
   wherein a page of the page units is a minimum unit of virtual allocation of the storage area,
   wherein when the failed track occurs and the failed track corresponds to the control area or the unallocated area, the storage control apparatus sets a bit position of the format bitmap corresponding to a page allocated to the failed track to ON, and
   wherein when the storage area corresponding to a page allocated to the failed track is formatted, the storage control apparatus sets a bit position of the format bitmap corresponding to a page included in the formatted storage area to OFF.

2. The storage control apparatus according to claim 1, wherein
   when an I/O request is received from a host, the storage control apparatus formats the storage area corresponding to a page the format bitmap of which is set to ON.

3. The storage control apparatus according to claim 2, wherein
   the physical storage is made redundant, and
   the storage control apparatus is configured to:
   generate a real capacity pool that integrates the physical storage which is made redundant; and
   allocate a virtual capacity volume in the page units from the real capacity pool in accordance with a request from the host.

4. The storage control apparatus according to claim 3, wherein
   the physical storage which is made redundant is grouped into device groups, and
   the real capacity pool manages the device groups in an integrated manner.

5. The storage control apparatus according to claim 4, wherein
   the storage control apparatus is configured to generate a logicalized pool volume for each device group, and
   the real capacity pool manages the pool volumes in an integrated manner.

6. The storage control apparatus according to claim 5, further comprising:
   an I/O control unit configured to transmit and receive data to and from a cache based on an I/O request from the host; and
   a storage device control unit configured to write cached data into the physical storage based on an I/O request from the I/O control unit, wherein
   the I/O control unit is configured to:
   specify the virtual capacity volume to which a track to be an update target is allocated; and
   specify a logical device corresponding to the virtual capacity volume,
   the storage device control unit is configured to:
   specify the device group related to the logical device based on an I/O request from the I/O control unit to the logical device; and configure, when I/O to the physical storage included in the device group fails, a status of the logical device related to the device group as failed, and the I/O control unit is configured to:

configure a track allocated to the virtual capacity volume corresponding to a logical device, the status of which is configured as failed, as the failed track;

specify a page corresponding to the virtual capacity volume to which the track configured as a failed track is allocated; and set, when a page type of the page corresponds to the control area or the unallocated area, a bit position of the format bitmap corresponding to the page to ON.

7. The storage control apparatus according to claim 6, wherein the I/O control unit is configured to:

specify, when there is an I/O request from the host, the virtual capacity volume corresponding to a page a bit position of the format bitmap of which is set to ON; and specify a logical device corresponding to the virtual capacity volume, and the storage device control unit is configured to:

specify the device group related to the logical device based on an I/O request from the I/O control unit to the logical device; and perform formatting of the physical storage included in the device group.

8. The storage control apparatus according to claim 1, wherein when the failed track corresponds to user data, the storage control apparatus does not format a storage area of the physical storage corresponding to the user data.

9. A recovery method of a failed track including a processor and a format bitmap for managing whether or not a physical storage is to be formatted in page units, the recovery method comprising the processor:

detecting whether or not a failure has occurred when writing data cached in track units to a physical storage, a track being a minimum unit during caching;

determining whether a failed track in which the failure has occurred corresponds to a control area or an unallocated area; and formatting, when the failed track corresponds to the control area or the unallocated area, a storage area of the physical storage corresponding to the control area or the unallocated area, wherein a page of the page units is a minimum unit of virtual allocation of the storage area, wherein when the failed track occurs and the failed track corresponds to the control area or the unallocated area, the storage control apparatus sets a bit position of the format bitmap corresponding to a page allocated to the failed track to ON, and wherein when the storage area corresponding to a page allocated to the failed track is formatted, the storage control apparatus sets a bit position of the format bitmap corresponding to a page included in the formatted storage area to OFF.

\* \* \* \* \*